US012521186B2

(12) United States Patent
Reimer et al.

(10) Patent No.: US 12,521,186 B2
(45) Date of Patent: Jan. 13, 2026

(54) DYNAMIC 3D SCANNING ROBOTIC LAPAROSCOPE

(71) Applicant: Genesis Medtech (USA) Inc., Saint Louis Park, MN (US)

(72) Inventors: Brendan Reimer, Eden Prairie, MN (US); Bin Zhao, Ellicott City, MD (US); Shan Wan, Plymouth, MN (US)

(73) Assignee: GENESIS MEDTECH INTERNATIONAL PRIVATE LIMITED, Singapore (SG)

( * ) Notice: Subject to any disclaimer, the term of this patent is extended or adjusted under 35 U.S.C. 154(b) by 411 days.

(21) Appl. No.: 18/079,410

(22) Filed: Dec. 12, 2022

(65) Prior Publication Data

US 2023/0181263 A1 Jun. 15, 2023

Related U.S. Application Data

(60) Provisional application No. 63/288,749, filed on Dec. 13, 2021.

(51) Int. Cl.
*A61B 34/20* (2016.01)
*A61B 34/30* (2016.01)

(52) U.S. Cl.
CPC .............. *A61B 34/20* (2016.02); *A61B 34/30* (2016.02); *A61B 2034/2046* (2016.02)

(58) Field of Classification Search
CPC ............ A61B 34/20; A61B 2034/2046; A61B 2090/365; A61B 34/30; A61B 90/361; A61B 2034/2051
See application file for complete search history.

(56) References Cited

U.S. PATENT DOCUMENTS

| 9,259,289 | B2* | 2/2016 | Zhao | A61B 34/30 |
| 11,399,908 | B2* | 8/2022 | Diolaiti | A61B 90/361 |
| 11,723,642 | B2* | 8/2023 | Shelton, IV | A61B 1/00004 |
| | | | | 600/204 |
| 11,850,093 | B2* | 12/2023 | Williams | A61B 8/12 |
| 12,097,002 | B2* | 9/2024 | Diolaiti | A61B 34/37 |
| 2012/0290134 | A1 | 11/2012 | Zhao et al. | |

(Continued)

OTHER PUBLICATIONS

International Application No. PCT/US22/52537, International Search Report and Written Opinion mailed Mar. 28, 2023, 16 pages.

*Primary Examiner* — Vijay Shankar
(74) *Attorney, Agent, or Firm* — MagStone Law, LLP; Enshan Hong (57) ABSTRACT

A robotic system is integrated with the laparoscope effectively creating a 3D scanner which can be used during laparoscopic surgery. This enables advanced surgical navigation and visualization to aid with the surgical process. It also acts as a core data set to be used by the Digital Health Platform. This acts as the starting point for Virtual Reality reconstruction of the surgical procedure for both real time surgical guidance and advanced AI/ML development. Furthermore, diagnostic capabilities could also be integrated into the system to enable real time diagnostic data to be generated for use during the procedure. Coupling the diagnostic capabilities with the vision system of the laparoscope and the ground truth reference coordinate system of the robot enables quick Augmented Reality visualization through the Digital Health Platform.

20 Claims, 8 Drawing Sheets

(56) References Cited

U.S. PATENT DOCUMENTS

| | | |
|---|---|---|
| 2014/0276001 A1 | 9/2014 | Ungi et al. |
| 2019/0110847 A1 | 4/2019 | Diolaiti et al. |
| 2021/0012032 A1 | 1/2021 | Bishop et al. |
| 2022/0047339 A1* | 2/2022 | Prior ........................ A61B 1/05 |

* cited by examiner

(Prior Art)

Figure 9

DYNAMIC 3D SCANNING ROBOTIC LAPAROSCOPE

FIELD

This relates to medical instruments, and more specifically to a dynamic 3D scanning robotic laparoscope.

BACKGROUND OF THE INVENTION

Figure 1:
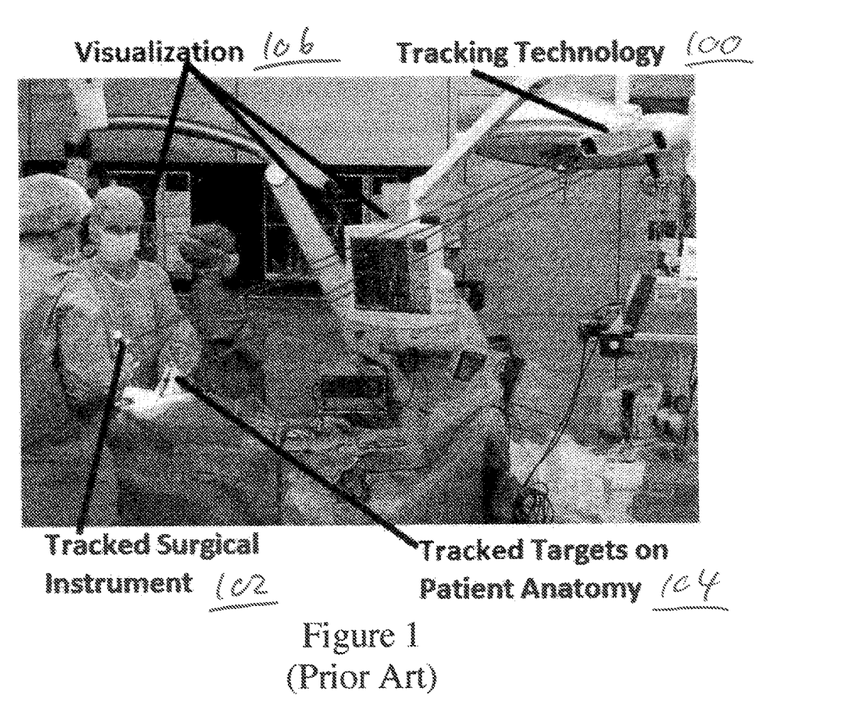
FIG. 1 shows an exemplary navigation surgical environment.

Advancements in diagnostic imaging have greatly improved pre-planning many surgical procedures. Advancements in surgical navigation have led diagnostic imaging to become an intraoperative tool to allow visualization during the surgical procedure. This is generally accomplished by attaching physical tracking targets that can be captured by a tracking technology to patient anatomy. The physical space is then registered to the corresponding anatomy in the diagnostic imaging. Furthermore, surgical instruments are then registered to the common tracking coordinate system. A common navigation surgical environment is shown in FIG. 1. A tracking device 100 can track surgical instrument 102 and targets 104 on patient anatomy. One or more visualization means 106 can display the patient anatomy in diagnostic imaging.

Figure 2:
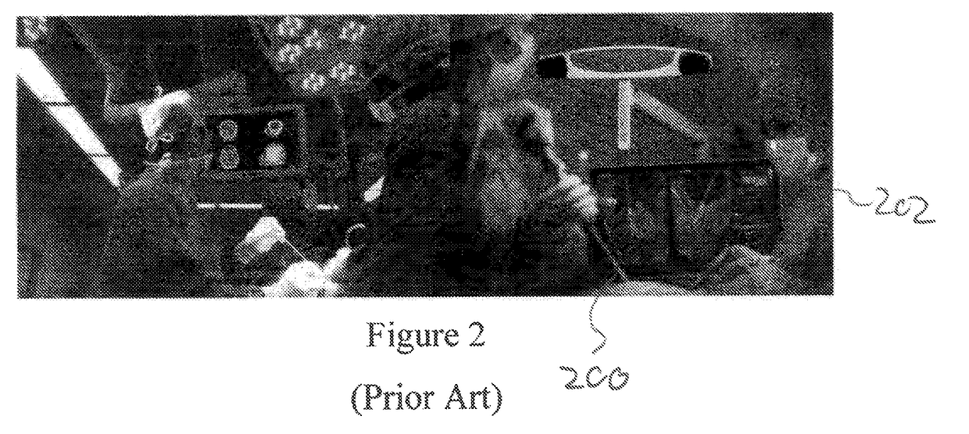
FIG. 2 shows an example of existing surgical navigation.

Surgical navigation is now commonplace in neurosurgery and spine surgery as shown in FIG. 2. Surgeons can visualize on screens 202 the locations of surgical instruments 200 in a patient's anatomy while performing an operation.

In both neuro and spine surgery, there is solid anatomy (e.g., skull and spine) that can anchor the tracking targets to enable registration. This registration enables surgeons to use preoperative images and planning to guide the surgical procedure for improving patient outcomes.

Figure 3:
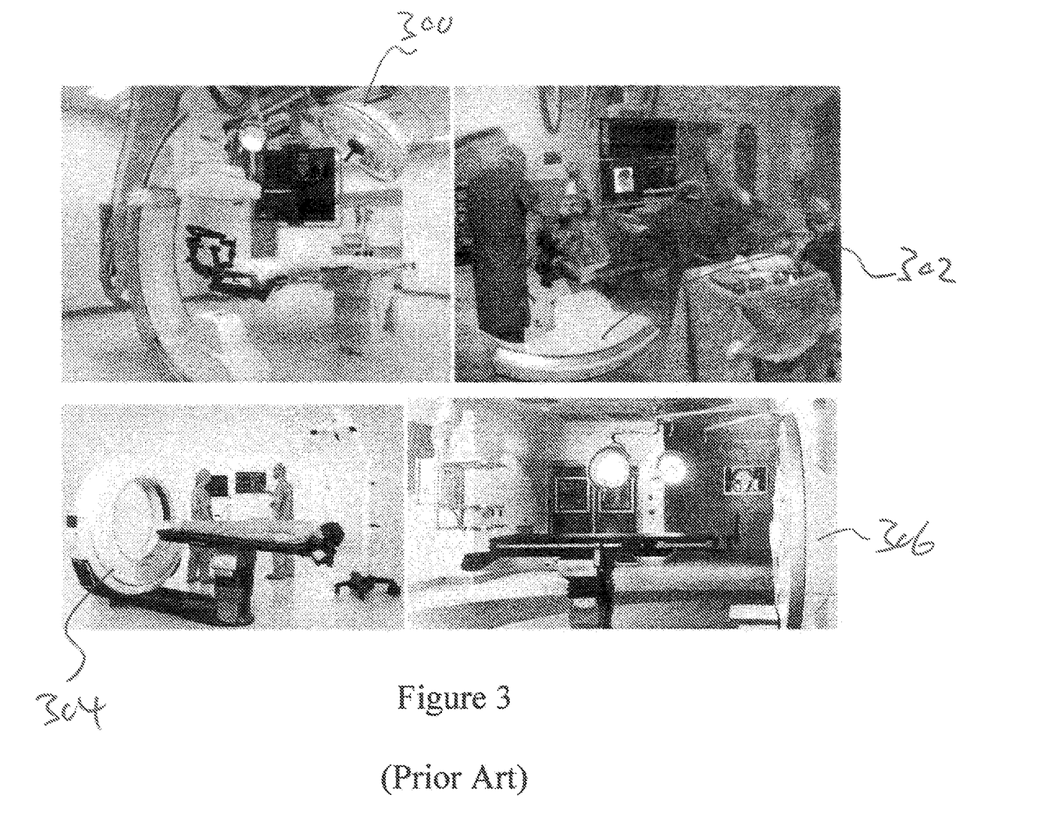
FIG. 3 shows examples of existing interoperative imaging devices.

Further developments have enabled diagnostic imaging to enter the surgical field. Intraoperative devices with angiography, computerized tomography (CT), and magnetic resonance (MR) capability have been developed which can update diagnostic images during the procedure. This further enhances visualization of the navigation devices by enhancing it with near real time data. Exemplary interoperative imaging devices 300, 302, 304, 306 are shown in FIG. 3 for reference.

Figure 4:
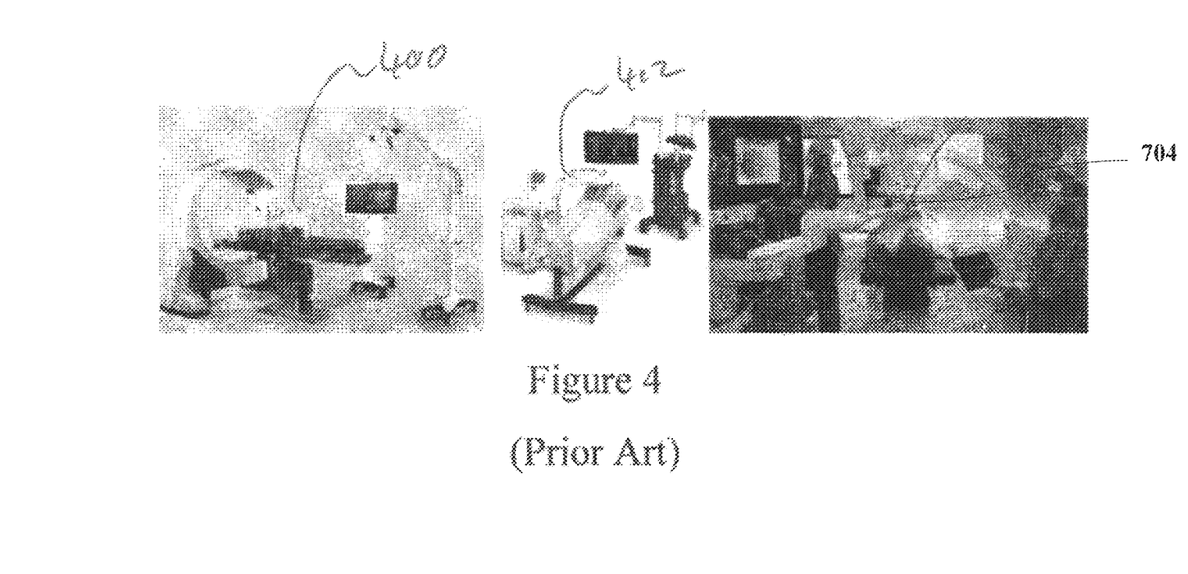
FIG. 4 shows examples of existing hybrid surgical theatres with integration of robotics.

The next evolution of development for these hybrid surgical theatres is the integration of robotics. Registering the robot coordinate system to the patient space enables precision navigation during surgical procedures. Some such devices 400, 402, 704 are shown in FIG. 4.

Currently, these types of navigated surgical advancements have been limited in laparoscopic surgery for multiple reasons. First, the surgical environment is internal to the patient, making standard tracking technology line of sight impossible to track the surgical field of view. Without line of site to track targets in the surgical area, registration is impossible.

Second, the anatomy in the surgical field is highly variable and distorts during surgical preparation and throughout the course of the procedure. Registration for surgical navigation requires one or more ground truth tracked targets attached to the patient anatomy that are stable throughout the procedure. The patient anatomy in laparoscopic surgical field is constantly moving. There is no anatomical feature in the surgical view that is stable enough for attaching the ground truth navigation targets.

To advance laparoscopic surgery with similar visual and navigation techniques, a system and method of virtually recreating the laparoscopic surgical environment and registering it to a common stable reference frame is desired. Furthermore, techniques to register the virtual deformed surgical environment to preoperative and interoperative images have not been developed.

SUMMARY OF THE INVENTION

This relates to a robotic system that is integrated with a laparoscope that can effectively create a three-dimensional (3D) scanner that can be used during laparoscopic surgery. Embodiments of the system enable advanced surgical navigation and visualization to aid with the surgical process. They can also provide core data set to be used by a digital health platform. In some embodiments, the disclosed systems can act as the starting point for Virtual Reality (VR) reconstruction of surgical procedure for both real time surgical guidance and advanced AI/ML development.

Furthermore, diagnostic capabilities could also be integrated into the disclosed systems to enable real time diagnostic data to be generated for use during the procedures. Coupling the diagnostic capabilities with the vision system of the laparoscope and the ground truth reference coordinate system of the robot enables real-time Augmented Reality (AR) visualization through the digital health platform.

DETAILED DESCRIPTION OF PREFERRED EMBODIMENTS OF THE INVENTION

In the following description of preferred embodiments, reference is made to the accompanying drawings which form a part hereof, and in which it is shown by way of illustration specific embodiments, which can be practiced. It is to be understood that other embodiments can be used and structural changes can be made without departing from the scope of the embodiments of this disclosure.

Figure 5:
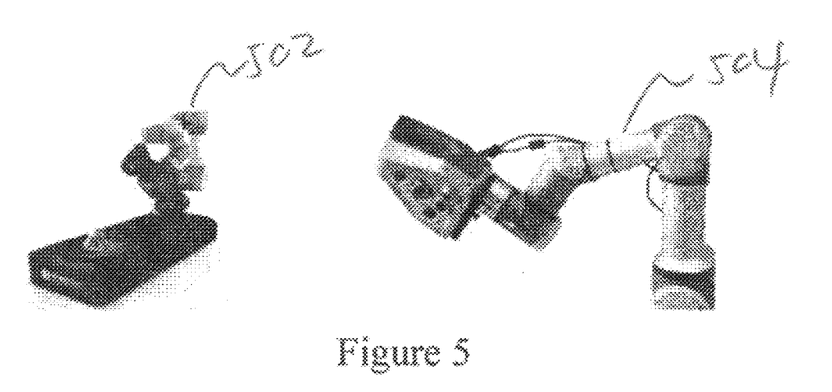
FIG. 5 shows exemplary integrations of robots with 3D scanning systems, according to an embodiment of the disclosure.

In one aspect of the disclosure, a method and system capable of 3D scanning the laparoscopic surgical scene is disclosed. In one embodiment, a robot can be integrated with surgical laparoscope to enable 3D scanning techniques for recreating the internal laparoscopic surgical environment. FIG. 5 illustrates exemplary robots 502, 504 as a common addition to 3D scanning systems.

Figures 6A, 6B:
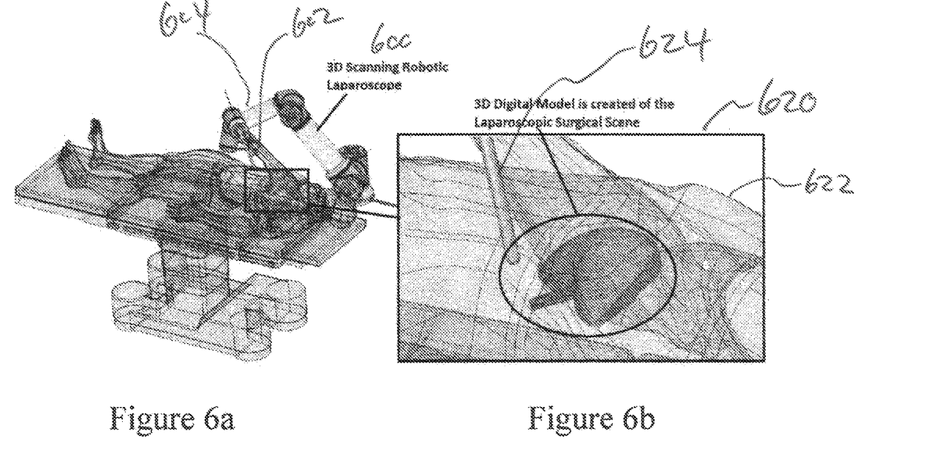
FIG. 6a shows an exemplary 3D scanning robotic laparoscope, according to an embodiment of the disclosure.
FIG. 6b shows an exemplary 3D digital model of a laparoscopic surgical scene created from multiple pictures taken from photogrammetric scanning by the 3D scanning robotic laparoscope of FIG. 6a, according to an embodiment of the disclosure.

Robotic integration is especially advantageous in photogrammetric scanning where multiple pictures are used to recreate 3D objects. FIGS. 6a and 6b illustrate an example of robotic integration in photogrammetric scanning. FIG. 6a illustrates a 3D scanning robotic laparoscope 600. The robotic laparoscope 600 includes a laparoscope 602 attached to a robotic arm 604. The laparoscope 602 can include a camera at its tip. A laparoscope camera in either single or stereo vision can be used as the camera for photometric scanning. Incorporating a robot (e.g., attaching the laparoscope 602 to a robotic arm 604) can effectively add multiple camera positions with known spatial relations by incorporating the kinematic coordinate system data of the robot. This can significantly increase both the accuracy and the speed of the scanning.

Photogrammetric scanning is one type of scanning technology that can be performed by the robotic laparoscope 600. Other 3D scanning technologies, such as laser triangulation and structured light, LIDAR and acoustic scanning can also be utilized as the 3D scanning engine in various embodiments of the system.

The output of the 3D scanning robotic laparoscope can be a 3D-modeled landscape of the surgical scene 620 including patient anatomy 622 and surgical instruments 624, as illustrated in FIG. 6b. This 3D modelled surgical scene can have numerous uses in both real time visualization and long-term data collection for machine learning.

Figure 7A:
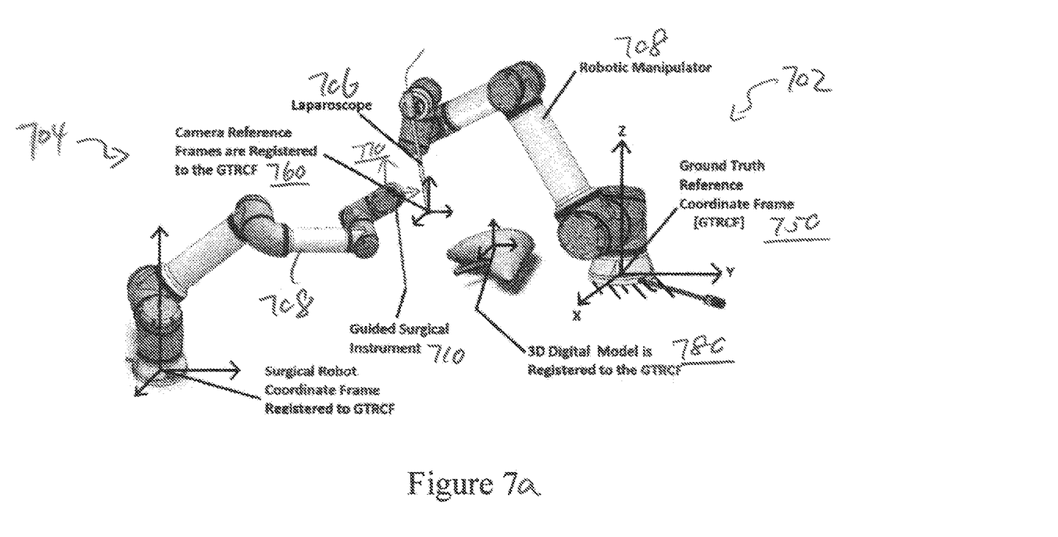
FIG. 7a shows an example of incorporation of a robot kinematic coordinate system into a 3D surgical scene, according to an embodiment of the disclosure.

Another aspect of the disclosure relates to a robot kinematic coordinate system that can be incorporated into the 3D surgical scene. FIG. 7a illustrates an exemplary surgical scene with multiple robotic instruments, namely, robotic laparoscope 702 and guided robotic surgical instrument 704 working in tandem during a procedure. Similar to the robotic laparoscope 600 of FIG. 6a, the robotic laparoscope 702 can include a laparoscope 706 attached to a robotic arm (or robotic manipulator) 708. The robotic arm 708 can be controlled by a first controller (not shown in FIG. 7). The guided surgical instrument 704 can include a guided surgical instrument 710 attached to a robotic arm (or manipulator) 712. The robotic arm 712 can be controlled by a second controller (not shown in FIG. 7).

The robot coordination system can coordinate both the robotic laparoscope 702 and the guided surgical instrument 704 using a stable Ground Truth Reference Coordinate Frame (GTRCF). In this example, the robot coordination system can set the GTRCF to a coordinate (e.g., x, y, z) 750 of the base of the robotic laparoscope 702. In other embodiments, the GTRCF can be set to the coordinate of any part of the robotic laparoscope 702 or another instrument (e.g., guided surgical instrument 704). It can determine and register the coordinates 760 of the camera reference frames of the laparoscope camera located at the tip of the robotic laparoscope 702 based on the relative spatial relation to the GTRCF. Similar, the robot coordination system can determine and register the coordinates 770 of the guided surgical instrument 704 based on the relative spatial relation to the GTRCF. Additionally or alternatively, the robot coordination system can also register the 3D digital model of the surgical scene 780 to the GTRCF. Although two instruments are illustrated in FIG. 7a, it should be understood that the robot coordination system can be scaled to work with any number of instruments, each of which can be registered to the GTRCF.

Figure 7B:
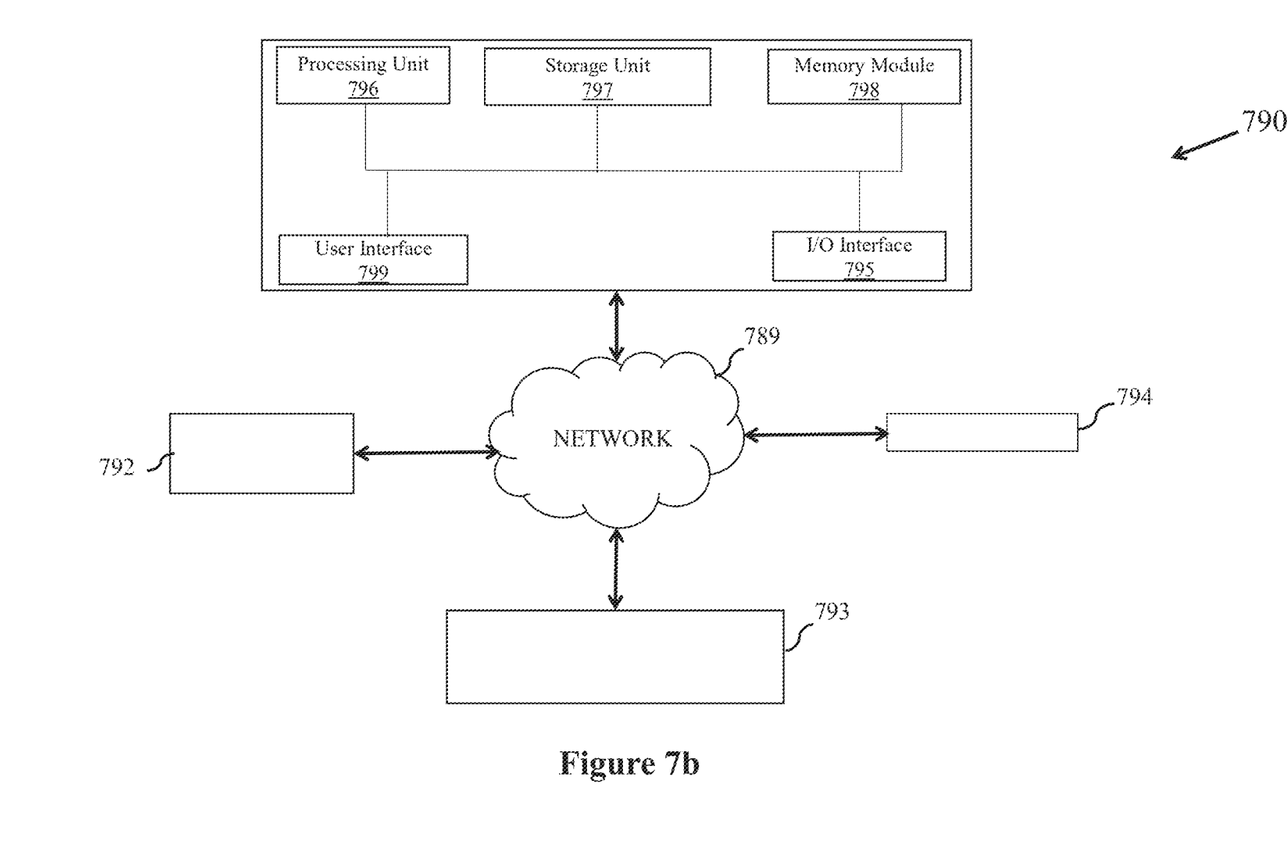
FIG. 7b shows the exemplary modules of the robot coordinate system of FIG. 7a, according to an embodiment of the disclosure.

FIG. 7b illustrates the exemplary components of the robot coordination system of FIG. 7a, according to an embodiment of the disclosure. The robot coordination system 790 can include a central coordination server 791 in communication with multiple robotic instruments 792, 793, 794 . . . . The central coordination server 791 can include, among other things, an I/O interface 795, a processing unit 796, a storage unit 797, a memory module 798, and user interface 799.

I/O interface 795 can be configured for communication with the robotic instruments 792, 793, 794. The communication can be via any suitable wired or wireless (e.g., Wi-Fi, Bluetooth) connections 789. Processing unit 796 may be configured to receive signals and process the signals to determine a plurality of conditions of the central coordination server 791. Processing unit 796 may also be configured to generate and transmit command signals, via I/O interface 795, to ascertain the coordinates of the various robotic instruments 792, 793, 794 connected to the central coordination server 791.

Storage unit 797 and/or memory module 798 may be configured to store one or more computer programs that may be executed by processing unit 796 to perform functions of the central coordination server 791. For example, the computer programs can set the GTRCF that can be used as a reference coordinate and keep track of the coordinates of other instruments by referencing the GTRCF in real time. Additionally or alternatively, the computer programs can generate a 3D digital model of the surgical scene based on the coordinates of the various instruments and the patient anatomy.

Storage unit 797 and memory 798 can be non-transitory computer-readable medium storing instructions which, when executed, cause one or more processors 796 to perform the method, as discussed in the various embodiments of the disclosure. The computer-readable medium can include volatile or non-volatile, magnetic, semiconductor, tape, optical, removable, non-removable, or other types of computer-readable medium or computer-readable storage devices. The computer-readable medium can have computer instructions stored thereon, as disclosed. In some embodiments, the computer-readable medium may be a disc or a flash drive having the computer instructions stored thereon.

It should be understood that central coordination system 790 of FIG. 7b can include additional components that are not shown in FIG. 7b and that some of the components shown in FIG. 7b may be optional in certain embodiments.

The above-described robot coordination system using ground truth reference frame can have numerous additional uses. For example, the ground truth reference frame can tie together 3D scanning data collected throughout the normal course of the surgery. It can also act as the stable coordinate system for incorporating surgical navigation techniques into laparoscopic surgery. Traditional reference frames in surgical navigation does not work due to the lack of a line of sight for tracking cameras and the unstable nature of the anatomy in the laparoscopic surgical scene. With the ground truth coordinate reference frame integrated with the robotic laparoscope kinematics (or other surgical instruments), registering more robotic devices into the ecosystem can be enabled through registration between multiple robotic kinematic coordinate frames. This can be the entry into precision guided robotics in laparoscopic procedures.

Referring to FIG. 7a again, in addition to acting as the ground truth reference frame, the robotic laparoscope 702 can have other uses in the laparoscopic environment including, for example, robotically controlled scanning routines to speed up the data collection, robotically auto tracking surgical tools for optimal laparoscopic image position, and coordinating movement between multiple robotic systems.

Figure 8:
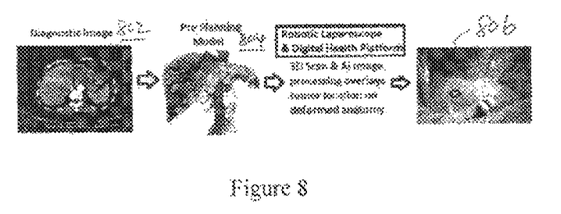
FIG. 8 shows the process of integrating 3D digitized modeled diagnostic data over deformed surgical 3D digitized scanned modeled anatomy, according to an embodiment of the disclosure.

Once the surgical scene is reconstructed using the robot kinematic coordinate system, artificial intelligence (AI) image processing can be used for recognizing anatomical features to register preoperative or interoperative imaging for advanced visualization to aid the surgical procedure. As illustrated in FIG. 8, AI processing can facilitate integrating the 3D digitized modeled diagnostic data 802 over the deformed surgical 3D digitized scanned modeled anatomy 804. This can then be overlayed on the laparoscopic view 806 to illustrate, for example the tumor location on the deformed anatomy.

In yet another aspect of the disclosure, embodiments can incorporate diagnostic capabilities to the robotic laparoscope. This can enable real time diagnostic data to be generated over the course of the surgical procedure. Because any diagnostic device can be incorporated within the robotic laparoscope, data generated can automatically be registered to both the laparoscope visual image and the robotic ground truth coordinate system of FIGS. 7a and 7b. This enables AR visualization seamlessly to a digital health platform. In one embodiment, using ICG (Indocyanine green guided) dye with near infrared imaging is an example of real-time imaging in laparoscopic surgery. With the development of microchip sensor technology, other diagnostic capabilities such as ultrasonic imaging could be implemented in a laparoscope. Incorporating the diagnostic capabilities directly into the 3D scanning robotic laparoscope can automatically register the diagnostic data to both the image of the laparoscope and the Ground Truth Reference Frame.

In an alternative embodiment, both the robotic laparoscope (e.g., 702 of FIG. 7a) and the guided surgical instrument (e.g., 704 of FIG. 4) can incorporate 3D tracking technology (a telemetry system) that can capture data (e.g., coordinates of the laparoscope and surgical instrument, coordinates associated with images captured by the laparoscope) that can be used for generating a 3D scanning of the surgical scene.

Figure 9:
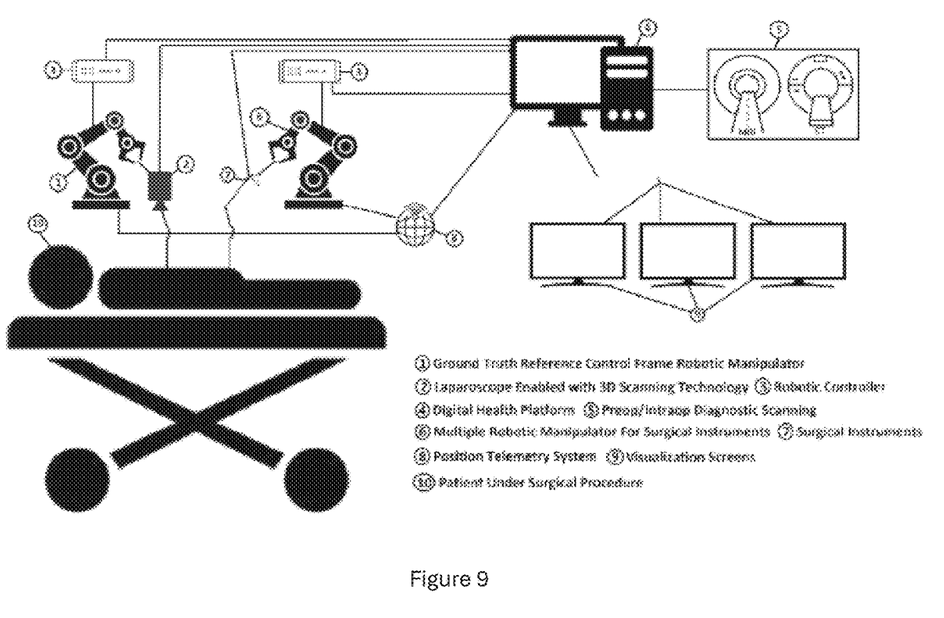
FIG. 9 is a system diagram showing the coupling of diagnostic capabilities with a vision system of the laparoscope to a ground truth reference coordinate system of a robot that enables quick Augmented Reality visualization through a digital health platform, according to an embodiment of the disclosure.

FIG. 9 is a system diagram showing the coupling of diagnostic capabilities with a vision system of the laparoscope to a ground truth reference coordinate system of a robot that enables quick Augmented Reality visualization through a digital health platform, according to an embodiment of the disclosure. The system 900 of FIG. 9 includes a GTRCF robotic manipulator 1, a laparoscope enabled with 3D scanning technology 2, robotic controllers 3, digital health platform 4, pre-op/intra-op diagnostic scanning 5, multiple robotic manipulators for surgical instruments 6, surgical instrument(s) 7, position telemetry system 8, visualization screens 9, and patient under surgical procedure 10.

The GTRCF robotic manipulator 1 manipulates the laparoscope 2. The GTRCF robotic manipulator 1 can also provide the GTRCF that can be used as a referenced in the AR. A second robotic manipulator 6 manipulates the surgical instrument(s) 7. The laparoscope 2 and the surgical instruments(s) 7 can be controlled by respective robotic controllers 3 to work in tandem on the patient 10 during the procedure. The position telemetry system 8 can capture and send the positions of the laparoscope 2 and the surgical instruments 7 to the digital health platform 4. The digital health platform 4 can receive images captured by the laparoscope 2 and any other instruments with a camera. The digital health platform 4 can also receive images from pre-op/intra-op diagnostic scanning 5. In turn, the digital health platform can recreate the internal laparoscopic surgical environment on visualization screens 9. Additionally and alternatively, the digital health platform can enable real time diagnostic data to be generated over the course of the surgical procedure.

The resulting data from the laparoscopic vision, diagnostic, and robotic spatial information can form a base data set to be implemented into the digital health platform 4. This data set can effectively create a time-based record of the surgical procedure which can be the base context for all the data collected in a universal surgical ecosystem. This context answers both what and why for the procedure under review effectively acting as the basis for a Virtual Reality reconstruction of the surgical procedure.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

The invention claimed is:

1. A method comprising:
setting a Ground Truth Reference Coordinate Frame (GTRCF) based on a stable reference point on a first robotic medical instrument;
receiving, from a position telemetry system, first coordinates of a camera of the first robotic medical instrument, the first coordinates determined based on the GTRCF;
receiving from the camera of the first robotic medical one or more images of a patient anatomy; and
generating a 3D representation of a patient anatomy based on the one or more images and the first coordinates, wherein the GTRCF is set to the first coordinates of at least one of the first robotic medical instrument and a guided surgical instrument.

2. The method of claim 1, further comprising:
receiving, from the position telemetry system, second coordinates of a second robotic medical instrument comprising a surgical instrument, the second coordinates determined based on the GTRCF;
wherein the 3D representation is generated based further on the second coordinates.

3. The method of claim 1, further comprising receiving pre-op/intra-op diagnostic scanning;
wherein the 3D representation is generated based further on the pre-op/intra-op diagnostic scanning.

4. The method of claim 1 wherein the 3D representation is generated in real time during a surgical procedure being performed with the first robotic medical instrument.

5. The method of claim 1, wherein the 3D representation comprises an augmented reality visualization.

6. A robotic laparoscope comprising:
a laparoscope connected to a robotic arm, the laparoscope comprising a camera;
a controller configured to operate the robotic arm to enable scanning by the camera from a plurality of angles; and
a stable reference point on the robotic laparoscope set as a Ground Truth Reference Coordinate Frame (GTRCF), wherein the GTRCF is set to a coordinate of at least one of the laparoscope and a guided surgical instrument.

7. The robotic laparoscope of claim 6 wherein coordinates of the camera can be determined from the GTRCF.

8. A system comprising:
a first robotic medical instrument comprising a camera attached to a first robotic arm;
one first controller configured to control the first robotic arm; and
a position telemetry system connected to the first robotic medical instrument and configured to track a first position of the camera;
wherein a stable reference point on the first robotic medical instrument is set as a Ground Truth Reference Coordinate Frame (GTRCF) of the system, wherein the GTRCF is set to a coordinate of at least one of the first robotic medical instrument and a guided surgical instrument.

9. The system of claim 8 wherein the first robotic medical instrument comprises a laparoscope.

10. The system of claim 8 wherein the stable reference point is located on a base of the first robotic arm.

11. The system of claim 8 further comprising:
a second robotic medical instrument comprising a second robotic arm; and
a second controller configured to control the second robotic arm;
wherein the position telemetry system is connected to the second robotic medical instrument and configured to track a second position of the second robotic arm.

12. The system of claim 11, wherein the second position of the second robotic arm is determined based on the GTRCF.

13. The system of claim 11, wherein the second controller and the first controller are the same.

14. The system of claim 11, wherein the second robotic medical instrument comprises a surgical instrument attached to the second robotic arm.

15. The system of claim 14, further comprising a digital health platform connected to the position telemetry system, the first controller, the second controller, the camera, and the surgical instrument;
wherein the digital health platform is configured to generate a 3D representation of a patient anatomy using information comprising a first coordinates of the camera, a second coordinates of the surgical instrument, and one or more images captured by the camera.

16. The system of claim 15, wherein the digital health platform is further configured to receive images from pre-op/intra-op diagnostic scanning.

17. The system of claim 15, wherein the digital health platform is further configured to display the 3D representation in real time on a display.

18. The system of claim 15, wherein the digital health platform is further configured to generate real time diagnostic date during a surgical procedure being performed using the surgical instrument and the laparoscope.

19. The system of claim 15, wherein the 3D representation comprises an augmented reality visualization.

20. The system of claim 8, wherein the camera is configured to perform 3D scan of a patient anatomy.

* * * * *